United States Patent
Chicks et al.

(10) Patent No.: US 7,308,542 B1
(45) Date of Patent: Dec. 11, 2007

(54) DATA INTEGRITY PROTECTION FOR STORED DATA

(75) Inventors: R. David Chicks, Redmond, WA (US); Aidan T. Hughes, Bellevue, WA (US); Jay Ferdinand N. Alabraba, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 10/874,593

(22) Filed: Jun. 23, 2004

Related U.S. Application Data

(60) Provisional application No. 60/546,092, filed on Feb. 19, 2004.

(51) Int. Cl.
*G06F 12/00* (2006.01)

(52) U.S. Cl. .................................. 711/154; 713/190
(58) Field of Classification Search ................. 711/154
See application file for complete search history.

(56) References Cited

U.S. PATENT DOCUMENTS

| | | | |
|---|---|---|---|
| 5,632,681 A | 5/1997 | Bakoglu et al. | |
| 5,752,041 A | 5/1998 | Fosdick | |
| 5,794,246 A * | 8/1998 | Sankaran et al. | 707/101 |
| 5,991,414 A | 11/1999 | Garay et al. | |
| 6,056,786 A | 5/2000 | Rivera et al. | |
| 6,275,588 B1 * | 8/2001 | Videcrantz et al. | 380/255 |
| 6,587,881 B1 | 7/2003 | Agarwal et al. | |
| 2003/0093633 A1 * | 5/2003 | Thiesfeld et al. | 711/154 |
| 2003/0149671 A1 * | 8/2003 | Yamamoto et al. | 705/59 |
| 2003/0182598 A1 * | 9/2003 | Ma et al. | 714/39 |
| 2004/0052378 A1 * | 3/2004 | Shiragami et al. | 380/277 |
| 2004/0123132 A1 * | 6/2004 | Montgomery et al. | 713/200 |
| 2005/0165693 A1 * | 7/2005 | Moritzen | 705/59 |

OTHER PUBLICATIONS

Qiong Liu, et al., Digital Rights Management for Content Distribution, AISW2003, 2003, 10 pages, Adelaide, Australia.
R.A. Freiburghouse, Register Allocation Via Usage Counts, Communications of the ACM, Nov. 1974, pp. 638-642, vol. 17-No. 11.

* cited by examiner

*Primary Examiner*—Brian R. Peugh
*Assistant Examiner*—Hashem Farrokh
(74) *Attorney, Agent, or Firm*—Amin, Turocy & Calvin, LLP

(57) ABSTRACT

The present invention leverages selections of data locations and comparative analysis of data values stored in these locations to provide a secure means of maintaining data integrity with minimal computational burdens. This provides, in one instance of the present invention, a tamper-resistant process to ensure that software application usage data is protected from malicious attacks. By storing and recalling data in an untraceable fashion, the present invention substantially increases the effort required to spoof the stored data. Additionally, comparative analysis is utilized with the randomized approach to facilitate in maintaining consistency of the stored data both in retrieval of information and when storing new data values. This allows checking of the data prior to overwriting sensitive data, thwarting malicious attacks that spoof new data as a means to alter the stored data.

35 Claims, 10 Drawing Sheets

DATA INTEGRITY PROTECTION FOR STORED DATA

CROSS-REFERENCE TO RELATED APPLICATION

This application claims the benefit of U.S. Provisional Patent Application Ser. No. 60/546,092, which was filed Feb. 19, 2004, entitled A SYSTEM AND METHOD FOR SECURING DATA IN A COMPUTER SYSTEM.

TECHNICAL FIELD

The present invention relates generally to data control, and more particularly to systems and methods for providing integrity of stored data in a computing environment.

BACKGROUND OF THE INVENTION

The proliferation of digital information has allowed vast amounts of data to be shared very easily from almost anywhere in the world. One negative aspect of this proliferation is that often software programs (i.e., software applications) can also be disseminated quite easily. Anyone willing to connect to the Internet and access illegal copies of the applications can download these copies to any number of computers. This type of activity reduces the demand for compensated copies of the software application, and, thus, diminishes the profitability of the software. If this type of activity were allowed to run unchecked, software development businesses might be forced to stop producing the software and, in some cases, might go out of business due to the losses generated by illegal copying.

Many software companies have resorted to protecting their businesses by inserting protection schemes such as activation codes/keys and internet activation techniques. These types of protection allow the software applications to be freely disseminated, but some or all of the functions of the applications may be inhibited until the application is properly activated. Although this type of protection affords some insurance against illegal use of the software application, it can also limit a new customer from fully utilizing "trial" versions of the application software. This means that a customer who is reviewing an expensive application for utilization in their business may choose another product that has a fully functioning trial version because of the reduced amount of inconvenience it affords early on. This has led software companies to resort to other protection means that will allow their potential customers full access to their software functions. One means of accomplishing this is to keep track of the number of times the application has been "booted" or started. This allows the potential customers to fully utilize the software application without any restrictions except for the number of times the software application can be utilized before activating it.

Although tracking the number of boots solves issues with regard to providing a more attractive introduction to a software product, it can also lead to potential abuses of the product. Data associated with the booting process is often stored in areas of the user's computer that can be easily accessed. Unscrupulous users can access this information and alter it so that the software application can be utilized for an unlimited number of times. This circumvents the need for the user to register or purchase the product and equates to lost sales for the software company. In response to the altering of this application usage count data, companies have begun to hide the data in less obvious places. Although this prevented the casual user from illegally using the software, advanced computer users are still able to locate and alter the data relating to the usage of the software application.

Some software development companies also utilize an activation date scheme so that users can "try out" the full version of the software application for a given period of time. However, this type of trial management also has the same shortcomings as the counter method of usage limiting. The data associated with the activation date (i.e., date of first use) is typically stored on the user's computer as well. This allows the user access to the data, but also allows the user an opportunity to alter the data. Thus, despite advances in securing software applications, companies are still faced with the dilemma of desiring to allow fully activated trial versions of their software while protecting against unlimited usage of their products.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data control, and more particularly to systems and methods for providing integrity of stored data in a computing environment. Selections of data locations and comparative analysis of data values stored in these locations are leveraged to provide a secure means of maintaining data integrity with minimal computational burdens. This provides, in one instance of the present invention, a tamper-resistant process to ensure that software application usage data is protected from malicious attacks. By storing and recalling data in an untraceable fashion, the present invention substantially increases the effort required to spoof the stored data. Additionally, comparative analysis is utilized with the approach to facilitate in maintaining consistency of the stored data both in retrieval of information and when storing new data values. This allows checking of the data prior to overwriting sensitive data, thwarting malicious attacks that spoof new data as a means to alter the stored data. Thus, the present invention provides a substantial improvement in maintaining data integrity, such as for protection of software application usage data, regardless of whether the data is stored in application associated areas, in operating system associated areas, and/or in external storage areas and the like. The present invention is highly applicable to storing application count usage and/or application date usage information and the like.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
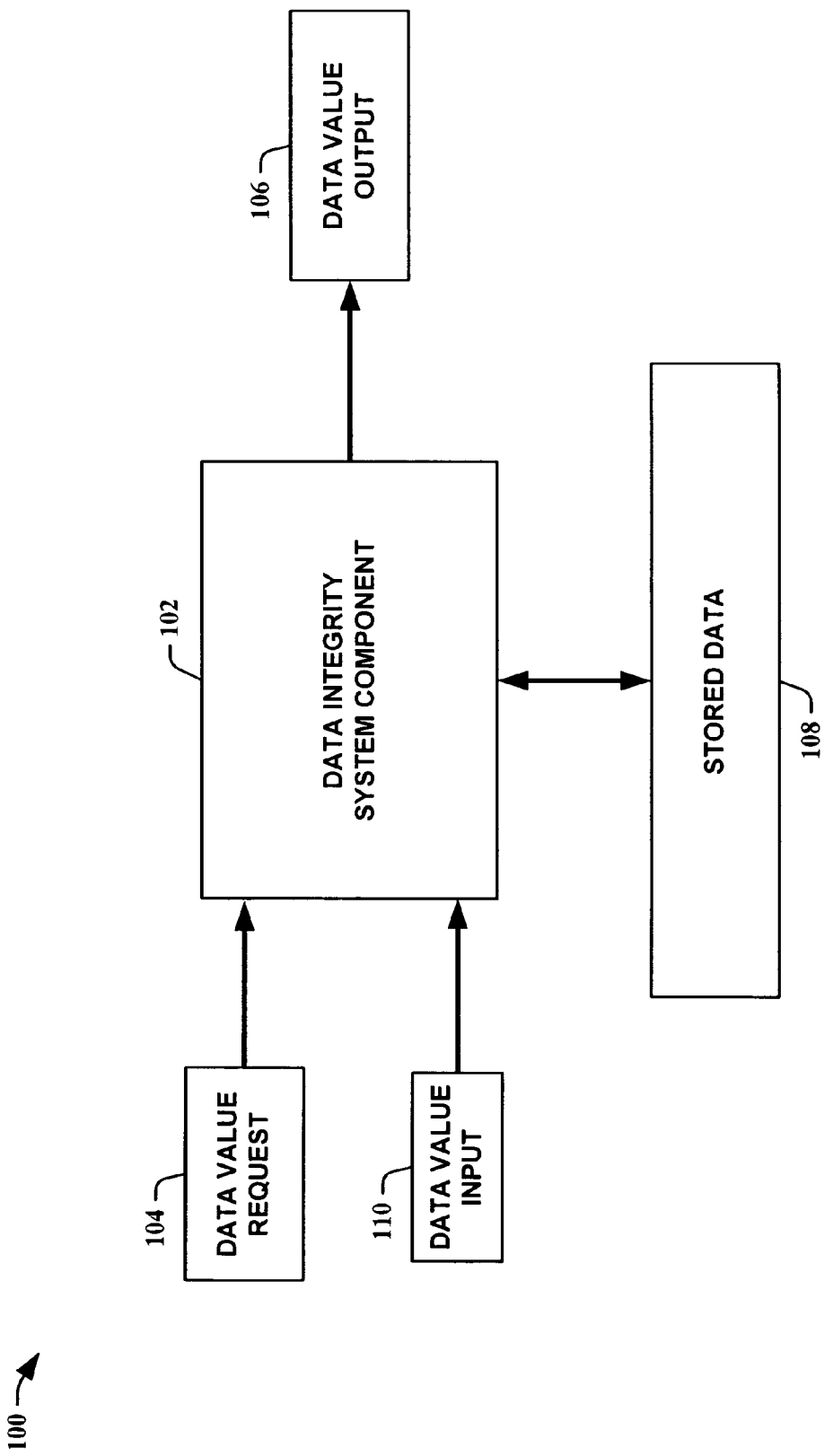
FIG. 1 is a block diagram of a data integrity system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides a secure means to protect the integrity of data stored within a computing system. The data itself can be tracking information such as counters and/or dates and the like. For example, there are many cases where it is useful to keep track of how many times an event has occurred (such as the launch of applications). At the same time, it is desirable to make it difficult for processes other than the application itself from changing the event counter. One instance of the present invention utilizes multiple counter locations and randomly selects among these counter locations to read from or write to at run time, and, in other instances, one (or more) location(s) which is(are) always used. This allows for more secure counters; usable by any application that needs to have a counter that is tamper-resistant. Thus, whether the locations are selected randomly, selected randomly with weighting, and/or pre-selected covertly and the like, the present invention eventually substantially increases the effort required to successfully spoof the stored data.

In FIG. 1, a block diagram of a data integrity system 100 in accordance with an aspect of the present invention is shown. The data integrity system 100 is comprised of a data integrity system component 102 that interfaces with stored data 108. The data integrity system component 102 receives a data value request 104 for a desired data item such as a counter value and/or a date and the like. Data integrity system component 102 then selects stored data locations associated with the desired data item from the stored data 108. The selection process utilized by the data integrity system component 102 can be, but is not limited to, random selection processes, random-weighted selection processes, and/or covert pre-selection processes and the like. The selection process is shielded such that malicious attackers are substantially impeded in determining what data locations have been and/or will be selected. A determination is then made as to a correct value for the data value request 104. This determined correct value is then output as a data value output 106. One skilled in the art can appreciate that the data value output 106 can be an optimum value such as a highest determined value for an incrementing counter or a lowest value for a decrementing counter and the like. The optimum value can also be an earliest date value or a most recent date value. Thus, during a reset, initialize, and/or error condition, a counter could be reset to zero and/or infinity and the like depending on the type of counter employed with the present invention. Likewise, a date system could be reset to an early date or a future/most recent date for a reset, initialize, and/or error condition and the like.

Figure 2:
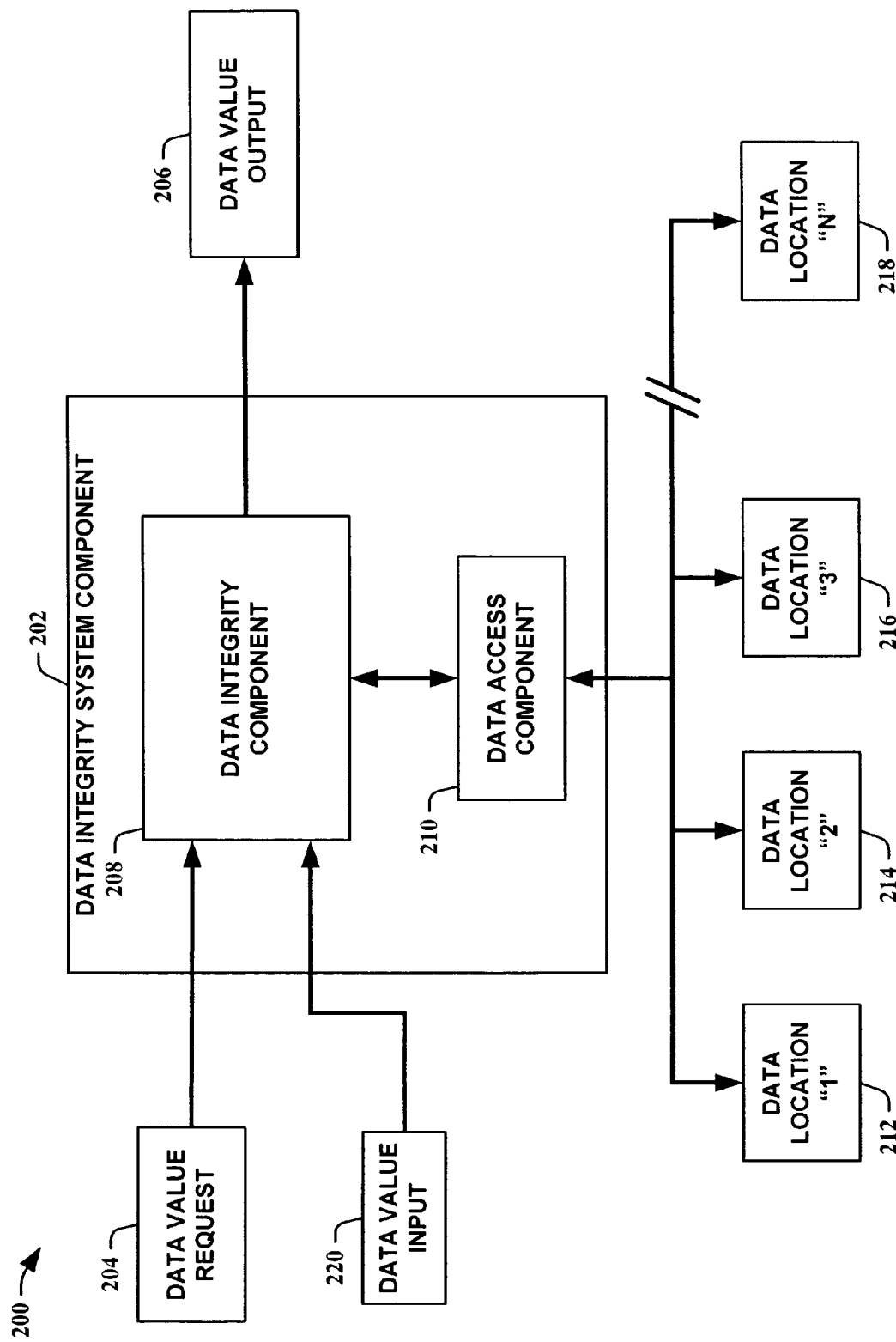
FIG. 2 is another block diagram of a data integrity system in accordance with an aspect of the present invention.

Referring to FIG. 2, another block diagram of a data integrity system 200 in accordance with an aspect of the present invention is illustrated. The data integrity system 200 is comprised of a data integrity system component 202 which is further comprised of a data integrity component 208 and a data access component 210. When a data value request 204 is received for a data item, the data integrity component 208 selects data storage locations associated with that data item and requests data values associated with those locations from the data access component 210. The data access component 210 interfaces with the selected data locations, such as subset of data locations 1-N 212-218, where N represents an integer from one to infinity, and retrieves the desired data values that are then returned to the data integrity component 208. The data integrity component 208 then determines the correct value for the requested data item and outputs it as a data value output 206. In other instances of the present invention, a data value input 220 can also be received by the data integrity component 208. The data integrity component 208 then selects data locations and data values via the data access component 210. The stored data values are analyzed against the received data value input and a determination is made as to a correct value to be stored for that particular data item.

Figure 3:
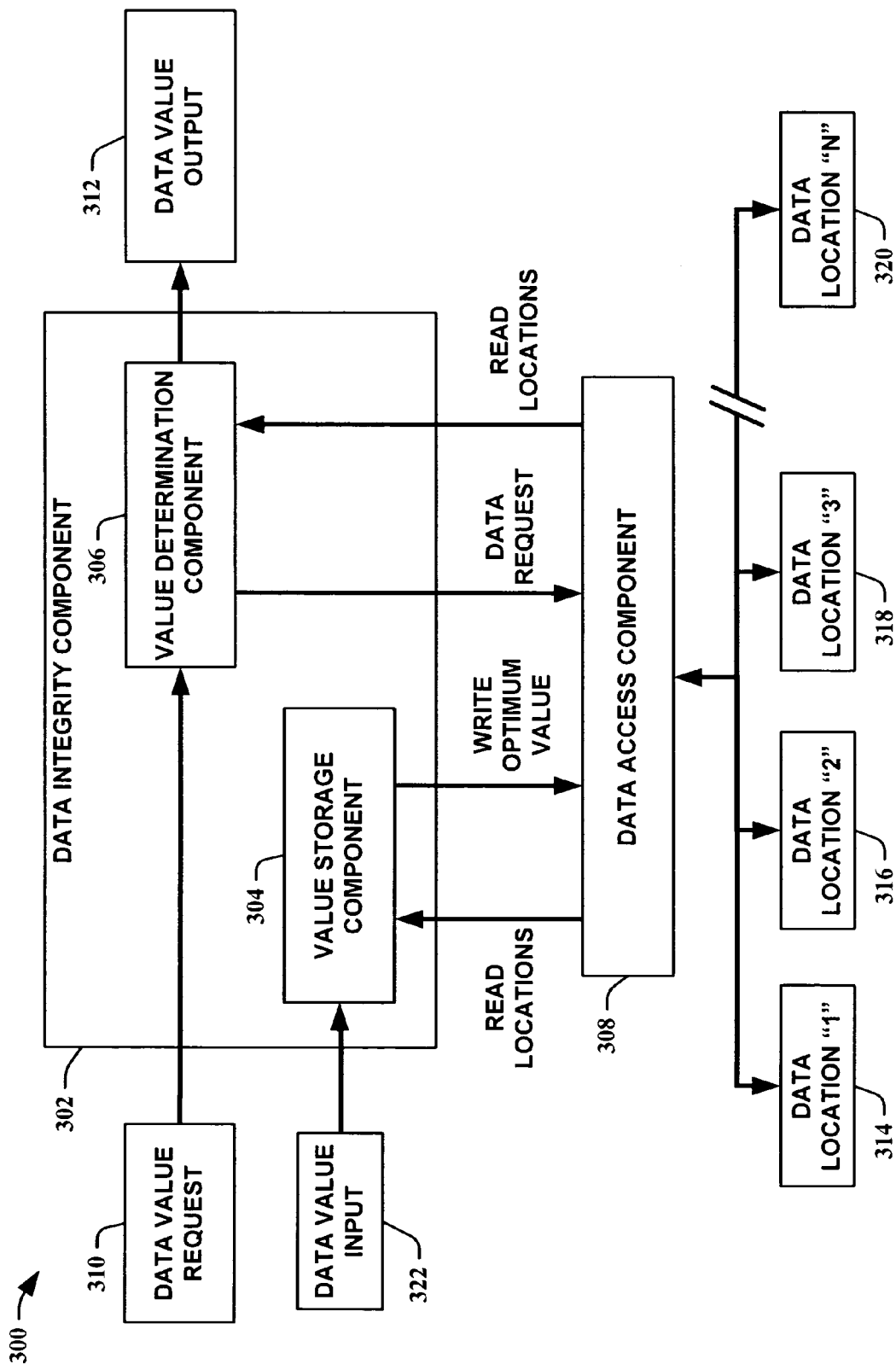
FIG. 3 is a block diagram of a data integrity system component in accordance with an aspect of the present invention.

Looking at FIG. 3, a block diagram of a data integrity system component 300 in accordance with an aspect of the present invention is depicted. The data integrity system component 300 is comprised of a data integrity component 302 and a data access component 308. The data integrity component 302 is comprised of a value storage component 304 and a value determination component 306. The value storage component 304 interfaces with a data value input 322 and the data access component 308. The value determination component 306 interfaces with a data value request 310, the data access component 308, and a data value output 312. The data access component 308 further interfaces with data locations 1-N 314-320, where N represents an integer from one to infinity. When the data value request 310 is received for a desired data item, the value determination component 306 selects a subset of the available data locations 1-N 314-320 and requests data values for these locations from the data access component 308. The data access component 308 retrieves the data values from the selected data locations and sends them to the value determination component 306. The value determination component then analyzes the selected data values to determine the correct data value for a given data item. This process, in one instance of the present invention, utilizes a highest value determination for the retrieved data values. Thus, if the data value represents a counter value, the highest counter value of the data values associated with the selected data locations is utilized as the correct data value which is then output as the data value output 312. However, one skilled in the art can appreciate that the data value output 312 can be an optimum value such as a lowest value for a decrementing counter and the like. The optimum value can also be an earliest date value or a most recent date value. Thus, during a reset, initialize, and/or error condition, a counter could be reset to zero and/or infinity and the like depending on the type of counter employed with the present invention. Likewise, a date system could be reset to an early date and/or a future/most recent date for a reset, initialize, and/or error condition and the like.

When data value input 322 is received by the value storage component 304, it 304 selects a subset of data locations 1-N 314-320 and requests data values associated with these locations via the data access component 308. The data access component retrieves the appropriate data values and sends them to the value storage component 304. The value storage component 304 then analyzes the received data values and compares them to the data value input 322. In one instance of the present invention, the analyses includes determining if the data value input 322 is greater than the data values retrieved from the selected data locations. If the data value input 322 is determined to be acceptable, its value is stored in the selected data locations. However, if the data value from the data value input 322 is deemed unacceptable, a further determination is made among the retrieved data values as to a correct value. In one instance of the present invention, a highest value of the retrieved data values is utilized as the correct value, and this value is then written to the selected data locations instead of the value from the data value input 322.

Figure 4:
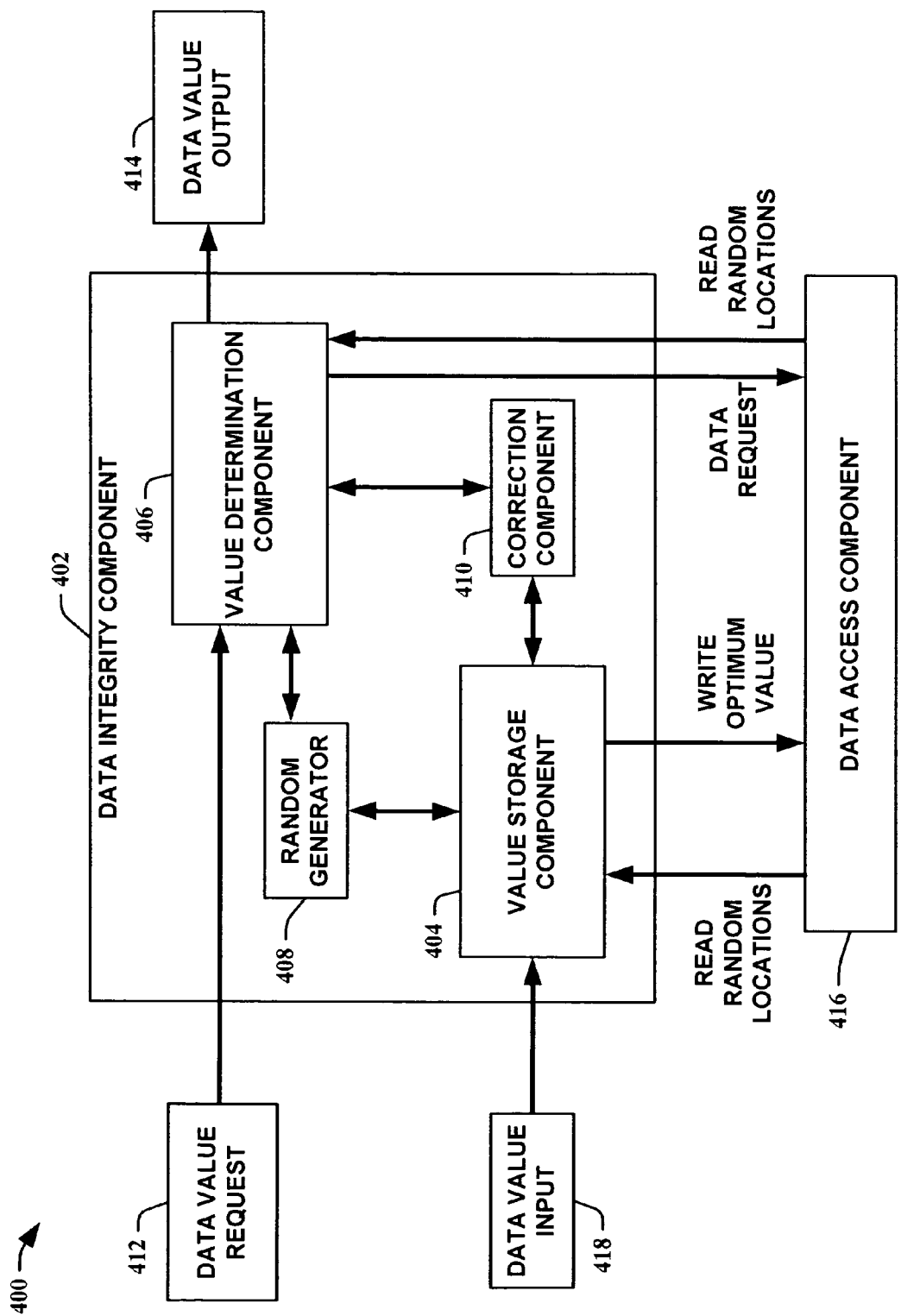
FIG. 4 is another block diagram of a data integrity system component in accordance with an aspect of the present invention.

Moving on to FIG. 4, another block diagram of a data integrity system component 400 in accordance with an aspect of the present invention is shown. The data integrity system component 400 is comprised of a data integrity component 402 and a data access component 416. The data integrity component 402 is comprised of a value storage component 404, a value determination component 406, a random generator 408, and a correction component 410. The value storage component 404 interfaces with a data value input 418 and the data access component 416. The value determination component 406 interfaces with a data value request 412, the data access component 416, and a data value output 414. The value storage component 404 and the value determination component 406 further interface with the random generator 408 and the correction component 410. Although the illustration denotes the value storage component 404 and the value determination component 406 interfacing with identical random generator 408 and correction component 410, in other instances of the present invention, these components 408, 410 can be substantially different for each of the value storage component 404 and the value termination component 406. The random generator 408 provides a random number value that can be utilized to determine random reading and/or random storage locations. Additionally, in other instances of the present invention, the random generator can also account for weight values associated with data storage locations. The weight values influence the selection of the randomness of the data storage location selection process. The correction component 410 can be utilized to determine correct data storage values and/or correct data output values. When functioning to determine a correct data output value in one instance of the present invention, the correction component 410 can employ a highest value determination process to ensure data integrity. When functioning to determine a correct data value to store in the randomly selected storage locations in another instance of the present invention, the correction component 410 can evaluate whether the data value input 418 is greater than randomly selected stored data values, and, if not, utilize the highest value determination process to select a value to overwrite the stored data values.

In other instances of the present invention, the data value output 414 can be an optimum value such as a highest determined value for an incrementing counter or a lowest value for a decrementing counter and the like. The optimum value can also be an earliest date value or a most recent date value. Thus, during a reset, initialize, and/or error condition, a counter could be reset to zero and/or infinity and the like depending on the type of counter employed with the present invention. Likewise, a date system could be reset to an early date or a future/most recent date for a reset, initialize, and/or error condition and the like. This is also applicable to determining a correct data value to store in a data location.

In order to better understand how the above systems utilize different instances of the present invention, several examples are now elaborated upon. In one example instance of the present invention, there are several functions which read and write a counter value, each function corresponding to one location. Another function contains an array that includes pointers to each of these functions (and a weight value for each, in one instance of the present invention each is weighted equally, but that does not need to be the case), and at run time several (for example, two in this example instance of the present invention) distinct random number are chosen and the corresponding functions are called to read the counter value. Another function (could be more than one, but in this example instance of the present invention only one is utilized) is then called, and the highest value is selected. If the function is just reading, this value is then written to the two other locations if they had a lower value, and the value is returned. If the function was told to write a value, this value is compared with the value that is to be written, and the higher value is then selected, and written to any of the selected locations that have a lower value.

The locations of the counters can be closely tied to an application (e.g., included with user data), and/or it may be in a general OS (operating system) area (e.g., in the registry). The counter locations can also be stored externally to a computing system such as, for example, on an external drive such as, for example, a USB storage device and/or a physically remote storage device that can be communicated with via a remote communication means such as by telephone, satellite, Internet, and radio communication means and the like. An example counter structure is illustrated in Table 1 below.

TABLE 1

Counter Structure

```
{
    PFNCOUNTERFUNCTION pfnCounterFunction;
    BOOL fAlways;
    DWORD dwWeight;
    DWORD dwCount;
    BOOL fTried;
    BOOL fUsed;
}
```

There are many situations where it is useful to determine the number of times an event has occurred. For example, when a new application is installed in a computer system, the computer system and application may be configured to determine the number of times the application has been launched. This configuration is useful in situations where users are granted a fixed number of grace period uses before they are required to register the application with a business entity. Since it is desirable for a business entity to encourage users to register an application within a certain number of uses, it is desirable to have a method and system that makes it difficult for a user to tamper or modify the data that is used to monitor the number of uses.

For example, as a customer courtesy, some applications will allow a predefined number of grace pre-activation application launches or "grace boots." These free launches cannot be refreshed once spent. The grace boot information is defined in a file that associated with an application identifier, such as a serial number and the like, meaning that grace boots will be tracked on a per-product and/or per function basis. Grace boot counters are susceptible to backup and restore type of attacks so precautions must be taken to make these difficult to pull off successfully.

To prevent these types of attacks, the present invention provides a security mechanism that makes it difficult for users to modify data, e.g., counter data, stored in a computer system. In one instance, data is stored, such as counter data, in a number of randomly selected locations. The counter data can be stored in one central location (however, this is not required to utilize the present invention), such as, for example, in one area of the system registry. The central location can be referred to as a "master counter." In addition to storing counter data in the master counter, with each update of the master counter, another counter is randomly selected and updated. In each update, data stored in the master counter and the randomly selected counter is analyzed before the counters are updated, e.g., incremented. In one instance of the present invention, data is read from each counter, and data from the counter with a highest value is copied to the counters with a lower value. For example, if one counter has a value of 10 and another has a value of 14, both counters are updated with the higher value, 14. In another example, the counters are updated, e.g., incremented, while they are analyzed. In the former example, the counters of 10 and 14 would be updated with an incremented to a higher value, e.g., 15. In other instances of the present invention, any number of counters can be utilized. This can include, but is not limited to, a master counter and two, three or more other counters. In another example, two or three randomly selected counters can be employed without a master counter.

In another instance of the present invention, each counter can be stored in a specified section of memory, register, or a special database, such as a system registry. Each counter can be associated with a specific function. Thus, when a counter is to be updated, the system just calls a corresponding function. During execution, a random data location selection process randomly selects a few functions to read from or write to at run time, and one (or more) location(s) which is (are) always used. As noted above, there are several functions which read and write a counter value, each function corresponds to one location.

In yet another instance of the present invention, another function contains an array that includes pointers to each of the above-mentioned counter functions (and a weight value for each, in our implementation each is weighted equally, but that does not need to be the case), and at run time several (for example, two) distinct random numbers are generated and the corresponding functions are called to read the counter value. Another function (can be one or more) is (are) then called, and the highest value is selected. If the function is just reading, this value is then written to the two (or more) other locations if they had a lower value, and the value is returned. If the function was told to write a value, this value is compared with the value that is to be written, and the higher value is then selected, and written to any of the selected locations that have a lower value.

For example, in one instance of the present invention, counter status information is saved redundantly in several different locations. In yet another instance of the present invention, periodically, while an application is idle, all the save locations are updated with the 'worst' found value. This increases data integrity and security by making it necessary for malicious attackers to find and modify all the redundant save locations in order to successfully alter the data item's value. Randomly selecting a subset of storage locations also facilitates to increase security by preventing an attacker from discovering all storage locations via monitoring of read/write instructions. Examples of redundant storage locations can include, but are not limited to, the following:

Per-product locations can include, but are not limited to:
1. Product integration program files
2. License store
3. Darwin boot history
4. Application settings data blobs
5. Registry keys (e.g., HKLM, HKCU)
6. State management store
7. Crypto secure store
8. Kernel-protected registry: Standard behavior here is that the values and subkeys in this registry location are enumerated and locked (write-once, read-only, never modify) at boot time.

One instance of the present invention utilizes the above locations, for example, as described below:

1. Initial 'counts remaining' information is written to each of these locations on a per-product code basis and subsequent launches are tracked by an entry written for each boot.

The absence of any single 'Counts Remaining' key in any of these locations is treated as a failure case and the worst is assumed. Some counter save locations can be inaccessible at certain times; inability to update or absence of counts remaining information in any of the save locations is not considered a failure case.

2. Grace boots typically are required to be utilized within 30 days of the first application launch or they expire. Date/time at first launch (typically utilized as stated by BIOS (Basic Input Output System) clock, for example) is saved as part of the first launch counts remaining information. This information is updated at each launch to the last known date/time. Each write to each redundant save location is stamped with the current system time. This data is partially verified by checking to see that the date/time stamp for new counts is later than the first launch time and all other writes to that redundant save location.

3. Some instances of the present invention include hardware identification (HWID) as part of per-run grace count information stored in each location. The HWID for a last count is compared to a current HWID to ensure that the last count information is accurate and belongs to the current machine. If the HWIDs do not match, it is assumed that the information is invalid and reset with the worst value from the other locations.

In another instance of the present invention, an initial value is not written to the various storage locations. If the storage locations do not exist, it is assumed that they have not been utilized yet, and, thus, contain a "best" value. However, if it is not possible to read/write to a registry key such as, for example, a reg HKCU value, then the worst value is assumed. If it does not exist (but can be created), then it is assumed that it has not been initialized (first time this user has utilized the product). Failure to save to the HKCU reg value is a failure case, while the others are not.

When counter tampering is detected, i.e., when any of the active save locations is missing any of the 'counts remaining' keys, or it is not possible to find trusted counts remaining information, the worst is assumed and the grace boot count is set to zero. At this point, an application can be employed but only in a reduced functionality capacity if so desired by the application. Thus, the present invention can be employed in a variety of instances, some of which are described in the methods that follow.

In view of the exemplary systems shown and described above, methodologies that may be implemented in accordance with the present invention will be better appreciated with reference to the flow charts of FIGS. 5-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

Figure 5:
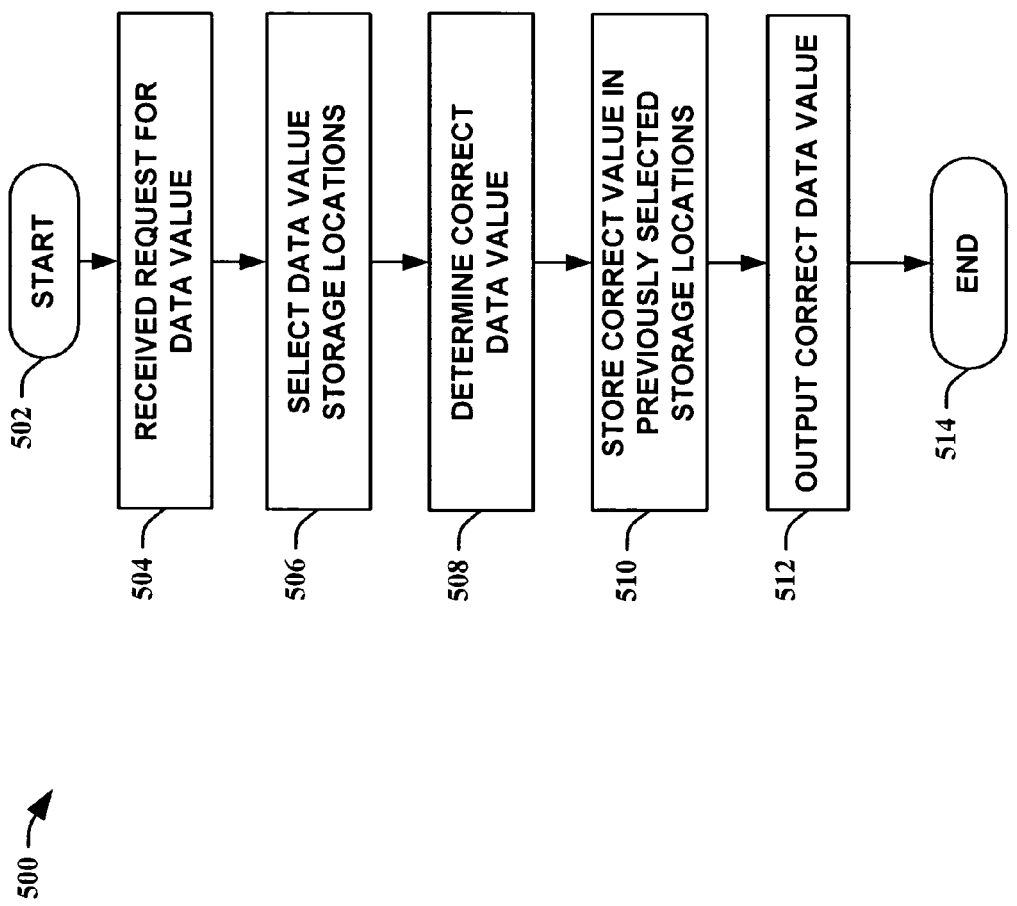
FIG. 5 is a flow diagram of a method of facilitating data integrity in accordance with an aspect of the present invention.

In FIG. 5, a flow diagram of a method 500 of facilitating data integrity in accordance with an aspect of the present invention is shown. The method 500 starts 502 by receiving a request for a data value 504. The request, for example, can come from a program that is starting to boot and requires a boot count to determine if it is allowed to continue the booting process. The request can also be in the form of a date value so that the application can determine if the boot request is within an allotted time period. Data storage locations are then selected 506. The selection process can include, but is not limited to, random selection processes, random-weighted selection processes, and/or pre-selection processes and the like. The selection process is shielded such that malicious attackers are substantially impeded in determining what data locations have been and/or will be selected. Additionally, the random selection process can include selecting among equally weighted data storage locations and/or can include an influenced random selection process that is affected by a weight value assigned to data storage locations. The weight value can induce selection of a particular storage location either more often or less often as deemed appropriate. A correct data value is then determined from data values associated with the randomly selected data storage locations 508. In one instance of the present invention, this determination is made by selecting a highest data value from the data values associated with the randomly selected data storage values. One skilled in the art will appreciate that other correct value selection criterion can be utilized within the scope of the present invention. The correct value can be an optimum value such as a lowest value for a decrementing counter and the like. The optimum value can also be an earliest date value or a most recent date value. Thus, during a reset, initialize, and/or error condition, a counter could be reset to zero and/or infinity and the like depending on the type of counter employed with the present invention. Likewise, a date system could be reset to an early date or a future/most recent date for a reset, initialize, and/or error condition and the like. Once the correct value has been determined, the correct value is stored in the randomly selected storage locations if necessary 510. For example, if only one randomly selected storage location contained the correct value, the other randomly selected storage locations are updated to the correct value. The correct value is then output 512, ending the flow 514.

Figure 6:
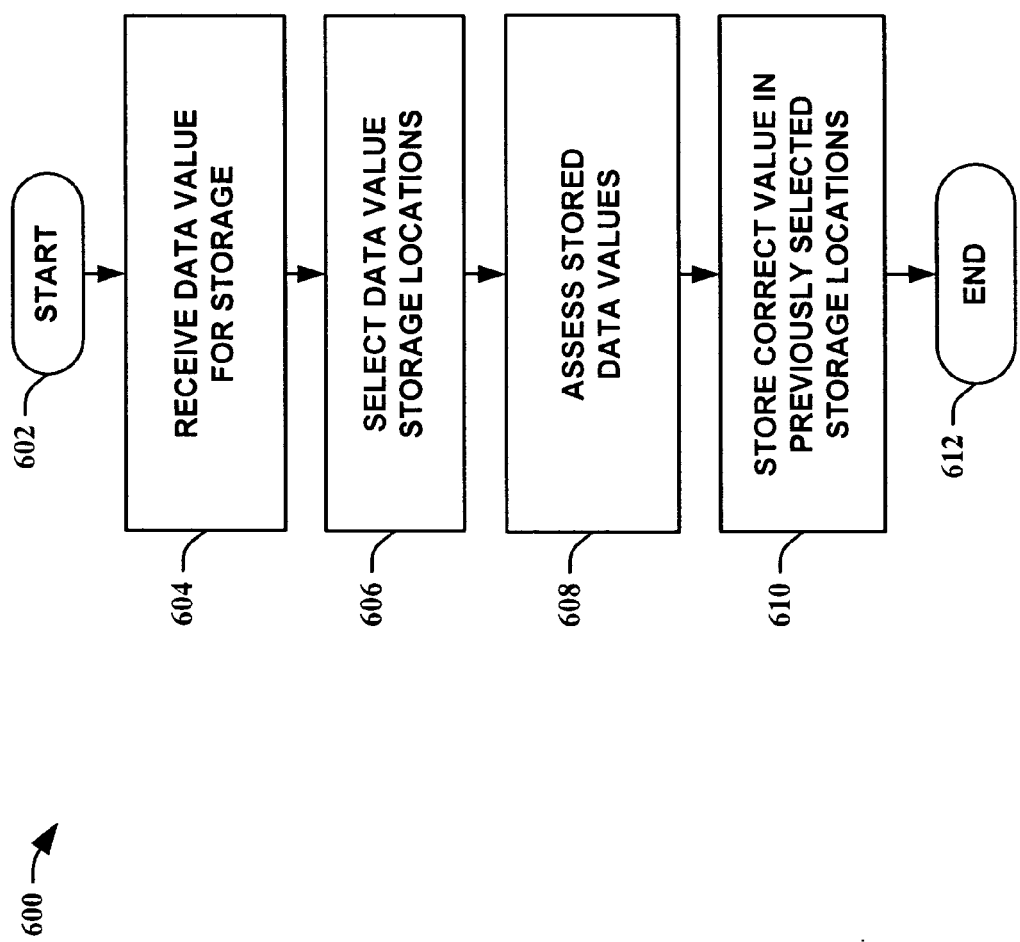
FIG. 6 is another flow diagram of a method of facilitating data integrity in accordance with an aspect of the present invention.

Referring to FIG. 6, another flow diagram of a method 600 of facilitating data integrity in accordance with an aspect of the present invention is depicted. The method 600 starts 602 by receiving a data value for storage that is associated with a data item 604. The data value can be, but is not limited to, data representing an event count and/or event date information and the like. A subset of data value storage locations associated with the data item are then selected 606. The selection process can include, but is not limited to, random selection processes, random-weighted selection processes, and/or pre-selection processes and the like. The selection process is shielded such that malicious attackers are substantially impeded in determining what data locations have been and/or will be selected. Data values currently stored in the subset of selected data storage locations are then evaluated to assess a correct data storage value 608. The evaluation can include, but is not limited to, ensuring that the data value to be stored is greater than the values currently stored in the data storage locations. If not, the correct data value can be determined to be, in one instance of the present invention, to be a highest data value selected from the current data values stored in the randomly selected data storage locations. One skilled in the art can appreciate that the correct value can also be an optimum value such as a lowest value for a decrementing counter and the like. The optimum value can also be an earliest date value or a most recent date value. Thus, during a reset, initialize, and/or error condition, a counter could be reset to zero and/or infinity and the like depending on the type of counter employed with the present invention. Likewise, a date system could be reset to an early date or a future/most recent date for a reset, initialize, and/or error condition and the like. Once the correct data value is determined, the randomly selected data storage locations are updated with the correct value 610, ending the flow 612.

Figure 7:
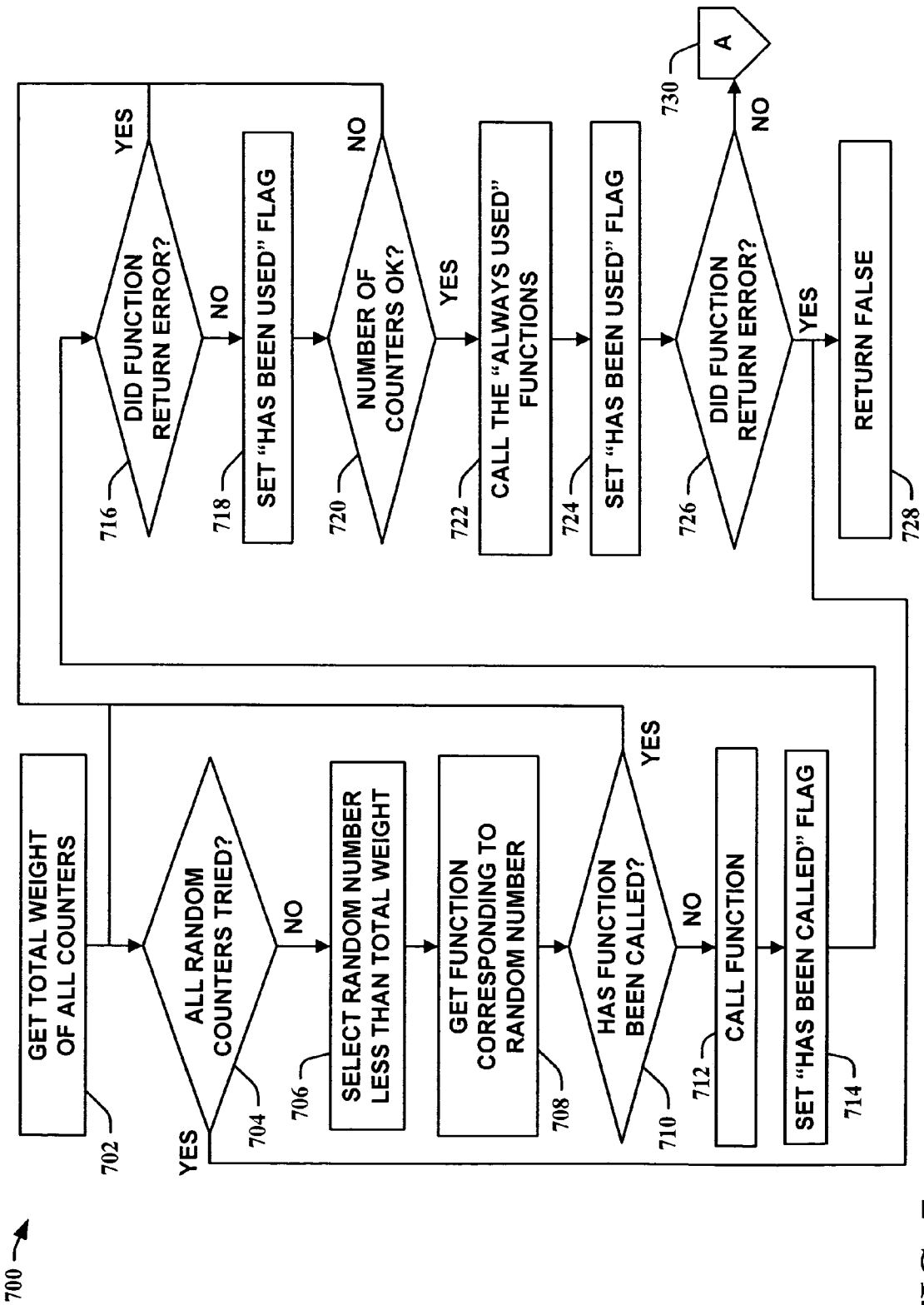
FIG. 7 illustrates one example of a method for implementing components related to the present invention.
Figure 8:
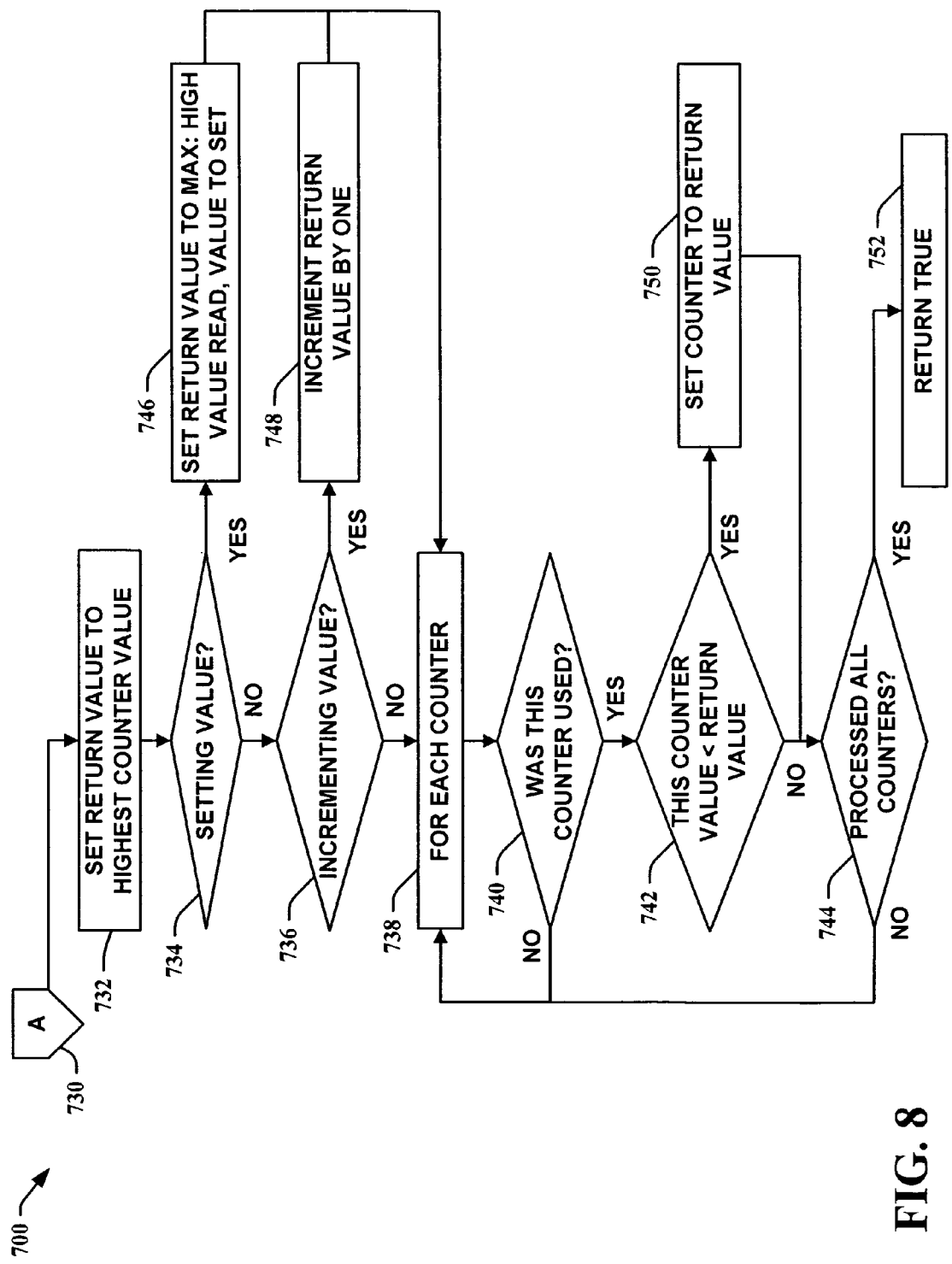
FIG. 8 illustrates one example of a method for implementing components related to the present invention.

FIGS. 7-8 illustrates a flow diagram of a method 700 according to an aspect of the present invention. The steps up to the function call are related to the process for randomly selecting a function to call. The remaining functions are related to the function calls and the updates to the counters related to each selected function. By the use of the random functions, it is difficult for a user to track which register is being used. If three or more counters are randomly used, it will be difficult for a user to modify all three to attempt to tamper with the counter data, thus providing more insurance that the user will only use the associated program a fixed number of times before it is registered. Some instances of the present invention utilize "return values" instead of direct count values. Thus, although an instance of the present invention returns a TRUE/FALSE value, it employs a pointer to a DWORD (32-bit unsigned value) where a count value is stored. Thus, the count value is returned via a process that utilizes a return value of just TRUE or FALSE.

In this example of an instance of the present invention, the method 700 starts by getting a total weight of all counter locations that store counter data 702. A determination is made as to whether all counters have been tried 704. If yes, a "false" indication is returned 728, ending the flow. This allows the process to continue until all counter locations have been utilized. However, if some counters have not been tried, a random number of storage locations is selected such that the number is less than the total weight of all of the counter locations 706. A function call is then made corresponding to the random number 708. A determination is then made as to whether the call has occurred 710. If the function has been called, the process repeats with determining whether all random counters have been tried 704. If not, the function is called 712 and a flag is set indicating that the function "has been called" 714. A termination is then made as to whether the called function returned an error 716. If an error was returned, the method 700 returns to determining if all random counters have been tried 704. If no error, a "has been used" flag is set for the function 718 and then a determination is made as to whether the number of counter locations is sufficient 720. If not, the method 700 returns to determining if all random counters have been tried 704. If the number of counter locations is sufficient, the "always used" functions are then called 722 and then they are flagged as "have been used" 724. A determination is then made as to whether a function returned an error 726. If yes, a "false" indication is given, ending the flow 728. If no error is indicated, the method continues to off-page indicator 730 which is continued on FIG. 8.

Referring to FIG. 8, the method 700 continues by setting a return value to the highest counter value of all of the randomly selected counter locations 732. A determination is then made as to whether the value is to be set 734. If yes, the return value is set to maximum value read 746 and the method 700 continues to the counter subroutine 738. If the value is not to be set, a determination is made as to whether the value is to be incremented 736. One skilled in the art can appreciate that other instances of the present invention can utilize a decrementing counter and/or a date tracking counter as well. If yes, the return value is incremented by one 748 and the method 700 continues to the counter subroutine 738. If the value is not to be incremented, the method 700 continues for each counter (738) and determines whether a counter was utilized 740. If no, the method 700 returns to 738 in order to make a further determination for the next counter. If yes, a determination is made as to whether the counter value is less than the return value 742. If yes, the counter is set to the return value 750 and the method 700 continues to determine if all counters have been processed 744. If no, the method 700 continues directly to the determination of whether all counters have been processed 744. If all processors have been used, a "true" indication is returned ending the flow 752. If not, the method 700 continues until all counters have been processed, beginning at 738.

Figure 9:
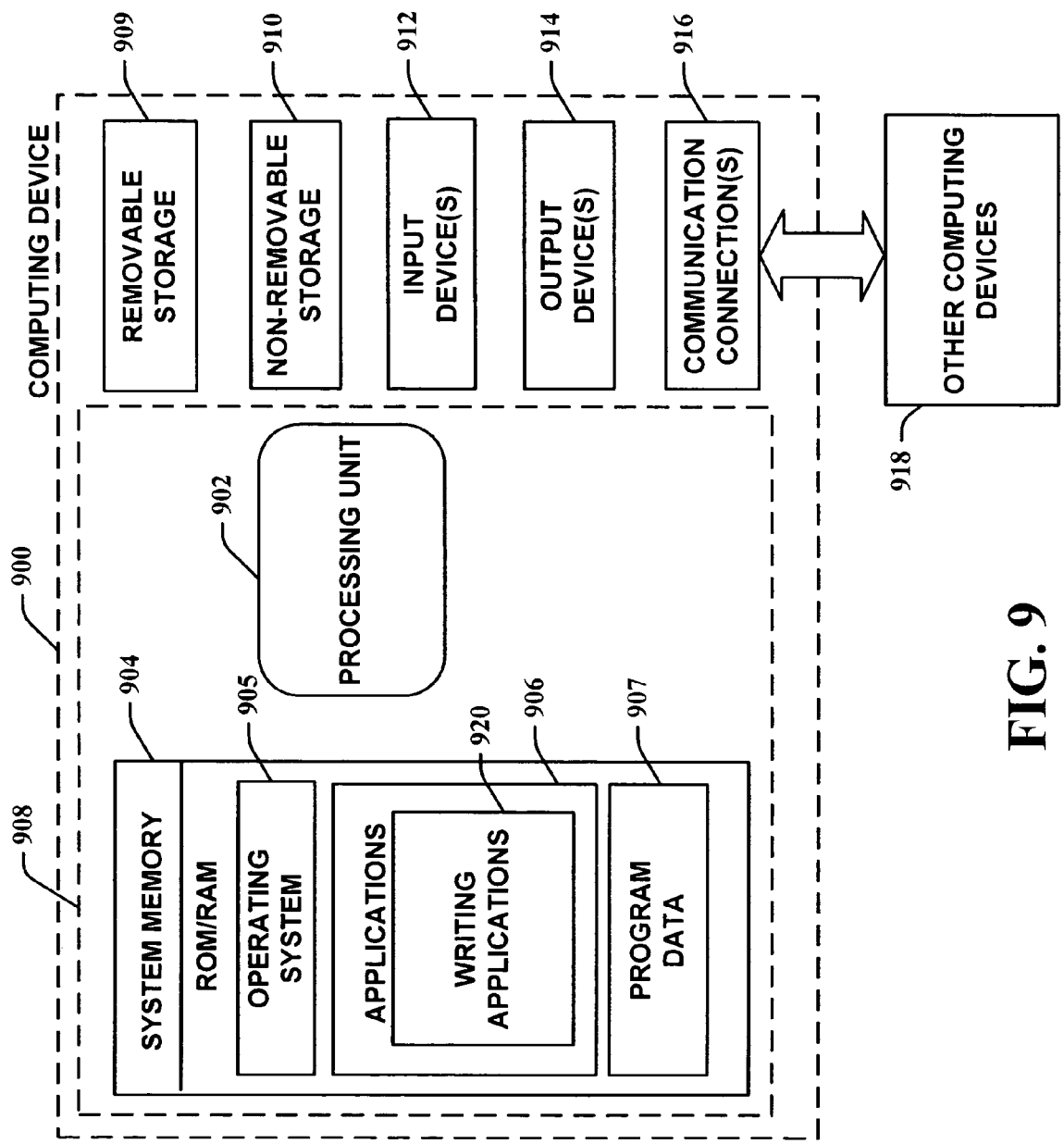
FIG. 9 illustrates an exemplary computing device that may be used according to exemplary instances of the present invention.

In order to provide additional context for implementing various aspects of the present invention, FIG. 9 and the following discussion is intended to provide a brief, general description of a suitable computing environment 900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term 'component' is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, one exemplary system for implementing the invention includes a computing device, such as computing device 900. In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 905, one or more applications 906, and may include program data 907. A pen and ink interface allows a user to enter writing directly on the touch screen. In one instance of the present invention, applications 906 may include a writing application 920. This basic configuration is illustrated in FIG. 9 by those components within dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900.

Computing device 900 also includes input device(s) 912 such as a touch screen input device, a stylus (pen), voice input device (speech recognition), an on-screen keyboard and writing pad, keyboard, mouse, etc. For example, a user could use the pen and writing pad to input their handwritten text into applications, and/or use the pen with the on-screen keyboard. Computing device 900 may also include output device(s) 914 such as an external display, speakers, printer, etc. may also be included.

Computing device 900 may also contain communication connection(s) 916 that allow the device to communicate with other computing devices 918, such as over a network. An exemplary communications connection is a wireless interface layer that performs the function of transmitting and receiving wireless communications. The wireless interface layer facilitates wireless connectivity between computing device 900 and the outside world. According to one instance, transmissions to and from the wireless interface layer are conducted under control of the operating system.

Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The computing device 900 may also contain a system registry. Additional information on the system registry and other components of the computing device 900 is provided in the Microsoft Computer Dictionary, Fifth Addition, 2002, the subject matter of which is specifically incorporated herein by reference. The subject matter published at http://msdn.microsoft.com is also specifically incorporated herein by reference.

Figure 10:
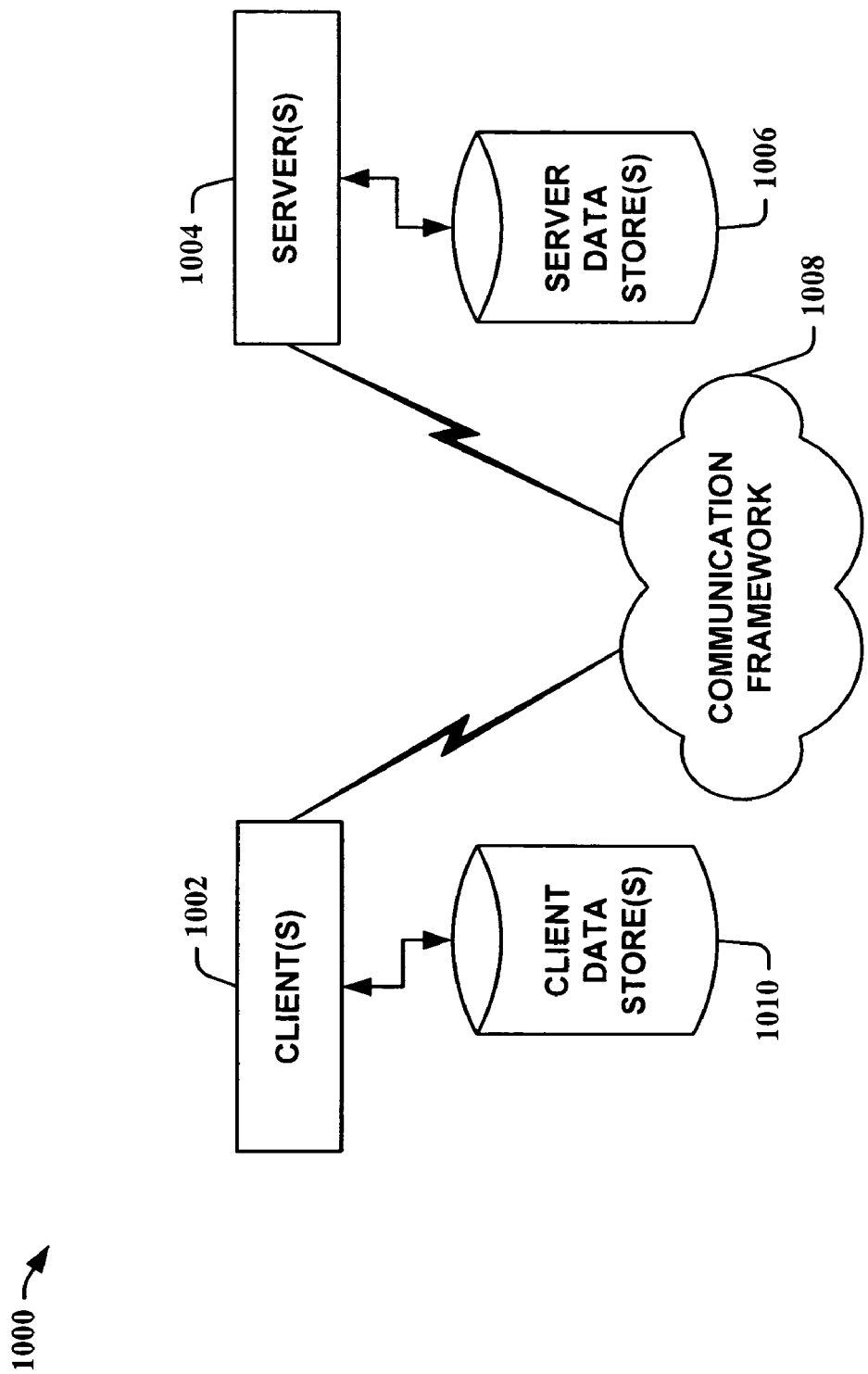
FIG. 10 illustrates an example operating environment in which the present invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The server(s) 1004 can house threads to perform transformations by employing the present invention, for example. One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

In one instance of the present invention, a data packet transmitted between two or more computer components that facilitates data integrity is comprised of, at least in part, information relating to a data integrity system that utilizes, at least in part, a plurality of data values from a plurality of data locations via a data location selection process to determine a correct value for a desired data item.

It is to be appreciated that the systems and/or methods of the present invention can be utilized in data integrity facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data integrity, comprising:
    an access component that interfaces with data values stored in a plurality of data locations;
    an integrity component that utilizes a plurality of data values provided by the access component via a random data location selection process to determine a correct value for a desired data item, the plurality of data locations comprising locations with a statistical weight value for each location that influences the random data location selection process; and
    a correction component that rectifies the plurality of data values to the correct value determined via the integrity component.

2. The system of claim 1, the data values containing a hardware identification (HWID) that provides association of the data values to relevant hardware.

3. The system of claim 1, the correct value comprising at least one selected from the group consisting of a highest value of the plurality of data values and a lowest value of the plurality of data values.

4. The system of claim 1, the correct value comprising at least one selected from the group consisting of a latest date and an earliest date.

5. The system of claim 1, the statistical weight value for each location comprising a substantially similar weight value.

6. The system of claim 1, the desired data item comprising a counter value representative of an access count for at least one function of at least one software application.

7. The system of claim 1, the desired data item comprising a date value representative of an initial usage date for at least one function of at least one software application.

8. The system of claim 1, the integrity component further comprising:
a data store component that receives a data value and utilizes the data location selection process to retrieve stored data values for comparison with the data value; the stored data values are replaced by the received data value if a determination criterion is met.

9. The system of claim 8, the determination criterion comprising a criterion based, at least in part, upon the stored data values being at least one selected from the group consisting of less than the received data value and greater than the received data value.

10. The system of claim 9, the data store component overwrites the stored data values with a highest value stored data value when the received data value is less than the highest value stored data value.

11. The system of claim 9, the data store component overwrites the stored data values with a lowest value stored data value when the received data value is greater than the lowest value stored data value.

12. The system of claim 8, the data integrity component further comprising:
an incrementing component that increments the received data value before it is stored.

13. The system of claim 8, the data integrity component further comprising:
a decrementing component that decrements the received data value before it is stored.

14. The system of claim 1, the plurality of data locations comprising locations from at least one selected from the group consisting of a location associated with an application, a location associated with an operating system, a location external to a computing device executing a tracked application.

15. The system of claim 14, the location associated with the operating system comprising a system registry.

16. The system of claim 14, the location associated with the application comprising an application's user data.

17. A computer readable storage medium having stored thereon computer executable components of the system of claim 1.

18. A device employing the system of claim 1 comprising at least one selected from the group consisting of a computer, a server, and a handheld electronic device.

19. A method for facilitating data integrity comprising:
accessing data values stored in a plurality of data locations via a random data location selection process for a desired data item, the random data location selection process further comprising assigning at least one weight value for at least one of the plurality of data locations;
comparing the data values accessed in the plurality of data locations to determine a correct data value for the desired data item; and
storing the correct data value for the desired data item in the plurality of data locations.

20. The method of claim 19, further comprising:
stamping the data values with a hardware identification (HWID) that provides association of the data values to specific hardware.

21. The method of claim 19, the desired data item comprising a counter value representative of an access count for at least one function of at least one software application.

22. The method of claim 19, the desired data item comprising a date value representative of an initial usage date for at least one function of at least one software application.

23. The method of claim 19, the weight value for each location comprising a substantially similar weight value.

24. The method of claim 19, the correct data value comprising a data value representing at least one selected from the group consisting of a highest data value of the accessed data values and a lowest data value of the accessed data values.

25. The method of claim 19 further comprising:
determining if the plurality of data locations contain a data value different from the correct data value; and
storing the correct data value in those data locations with the different data value.

26. The method of claim 19 further comprising:
receiving a data value for storage;
selecting a plurality of data storage locations;
determining data values stored in the plurality of data storage locations; and
storing the received data value in a data storage location whenever the data value from the data storage location has an optimum value.

27. The method of claim 26, the optimum value comprising at least one selected from the group consisting of a value less than the received data value and a value greater than the received data value.

28. The method of claim 26 further comprising:
storing a highest value of the data storage location data values whenever a stored data value is less than the highest value and the received data value is less than the highest value of the data storage location data values.

29. The method of claim 26 further comprising:
storing a lowest value of the data storage location data values whenever a stored data value is greater than the lowest value and the received data value is greater than the lowest value of the data storage location data values.

30. The method of claim 26 further comprising:
incrementing a received data value before it is stored in a data storage location.

31. The method of claim 26 further comprising:
decrementing a received data value before it is stored in a data storage location.

32. A device employing the method of claim 19 comprising at least one selected from the group consisting of a computer, a server, and a handheld electronic device.

33. A system that facilitates data integrity, comprising:
means for interfacing with data values in a plurality of locations; and
means for utilizing a plurality of data values from a subset of the plurality of locations via a data location selection process to determine a correct value for a desired data item;
means for rectifying the plurality of data values to the correct value for the desired data item;
means for receiving a data value for storage in at least one of the plurality of locations; and
means for storing the received data value when the received data value is an optimum value compared to data values stored in the plurality of locations.

34. The system of claim 33, the optimum value comprising at least one selected from the group consisting of a value less than the data values stored in the plurality of locations and a value greater than the data values stored in the plurality of locations.

35. A data packet, transmitted between two or more computer components, that is employed to rectify a plurality of data values to a correct value for a desired data item, the data packet comprising, at least in part, information relating to a data integrity system that utilizes, at least in part, the plurality of data values from a plurality of data locations via a random data location selection process to determine the correct value for the desired data item the plurality of data locations comprising locations with a statistical weight value for each location that influences the random data location selection process.

* * * * *